Oct. 23, 1962 W. HECOX ET AL 3,060,387

AMPLITUDE STABILIZED OSCILLATOR

Original Filed April 15, 1955

INVENTORS
William Hecox
Alexander Finlay, Jr.

BY Edward J. Nöé

ATTORNEY.

United States Patent Office 3,060,387
Patented Oct. 23, 1962

3,060,387
AMPLITUDE STABILIZED OSCILLATOR

William Hecox, Groveport, and Alexander Finlay, Jr., Columbus, Ohio, assignors, by mesne assignments, to The Sheffield Corporation, a corporation of Delaware
Original application Apr. 15, 1955, Ser. No. 501,602, now Patent No. 2,885,660, dated May 5, 1959. Divided and this application July 31, 1958, Ser. No. 754,509
2 Claims. (Cl. 331—183)

Figure 2:
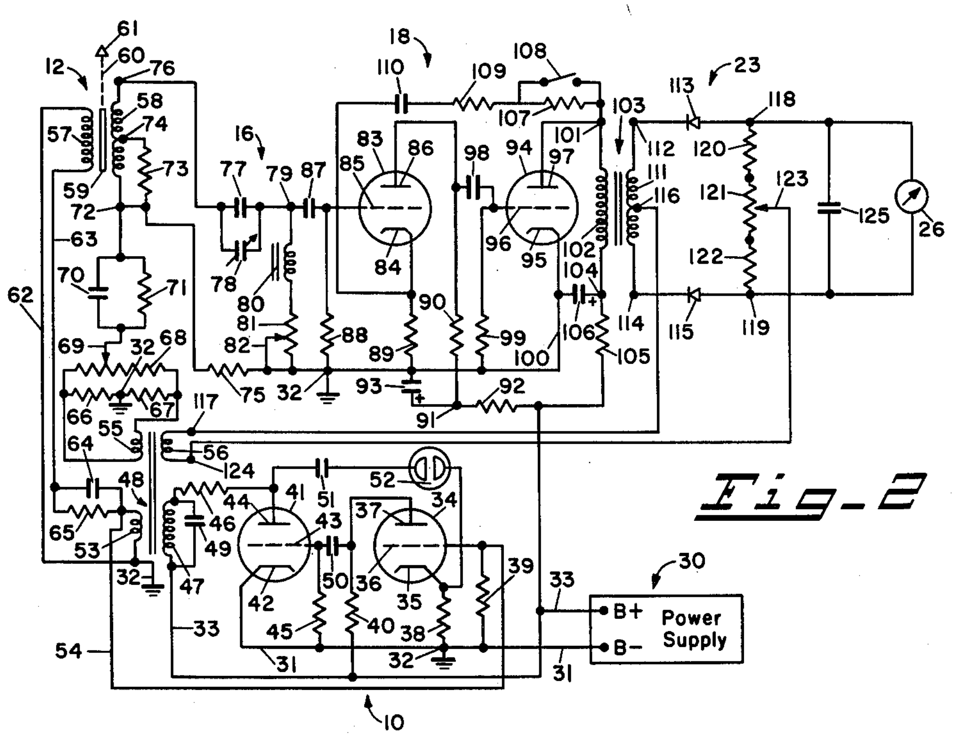

This invention relates to electronic gaging. It has to do more particularly with an improved gaging circuit using a novel amplitude-stabilized oscillator and a stable, constant-gain amplifier.

This application is a division of application 501,602 filed April 15, 1955, now Patent No. 2,885,660 by William Hecox et al. for Electronic Gaging.

The present invention is particularly useful in gaging systems of the type that are used primarily for the control of product quality. Such systems usually include not only gages but also means for classifying the gaged parts and means for presenting data for the control of a production process.

In the past, most gaging has been done manually. The classification of parts and the preparation of dimensional data for control purposes have also been done manually. Many modern machine tools now produce finished parts at rates up to several per second. In order to check satisfactorily the individual parts delivered from high-speed production lines, automatic gages have now become virtually a necessity. Manual gaging at high speed is expensive and is subject to human errors. Manual classifying has the same disadvantages of high expense and human errors. Manual presentation of data for control purposes also has the same disadvantages and is too slow. Automatic presentation of the control information reduces the labor involved and provides the information more rapidly so that lack of control of a process is especially useful in a fully automatic gaging system, and provides improved results therein.

Electronic dimension gages available prior to the present invention had the disadvantages of being larger and more expensive than the present improved gage. Voltage-regulated power supplies were required in these gages. Such gages would not provide gaging at the high speeds of which the present invention is capable, nor were they readily adaptable for use with automatic classifying and recording equipment.

A primary object of the present invention is to provide an improved electronic gaging device that overcomes the disadvantages of prior electronic gages as described above.

It is also an object of this invention to provide accurate and reliable high-speed gaging in an electronic gaging circuit suitable for use with electronic classifying and recording means in a fully automatic gaging system.

Another object is to provide an electronic gaging circuit having a stable oscillator capable of being supplied with power from ordinary commercial power sources without requiring the use of voltage regulating transformers or other voltage regulating equipment.

A further object of the present invention is to provide a stable oscillator for obtaining an output of constant amplitude without requiring the use of a regulated power supply.

The foregoing and other objects and advantages are provided by the invention disclosed herein.

In the present invention, an amplitude-stabilized oscillator excites a differential transformer. The modulated output of the differential transformer passes through a series-resonant filter, which filters out harmonics and provides voltage gain. From the filter, the amplitude-modulated carrier is fed to a stabilized feedback amplifier having means for switching the value of the feedback resistance to change the net gain of the amplifier and to permit gaging in more than one range. The gain of the amplifier is stabilized against variations in ambient conditions, such as line-voltage variations, by providing a large amount of negative feedback from the output end of the amplifier to the input end of the amplifier. The output of the amplifier is connected to a phase-sensitive rectifier circuit, or phase detector, which provides a direct-current output to a meter. The oscillator is connected also to the phase detector. A small voltage from the oscillator is fed to the secondary of the differential transformer to provide electrical control of an arbitrary reference point and to keep the point from moving when the scale is changed from one range to another. The stable oscillator includes degenerative-feedback means comprising a nonlinear impedance for maintaining constant-amplitude output of the oscillator.

Figure 1:
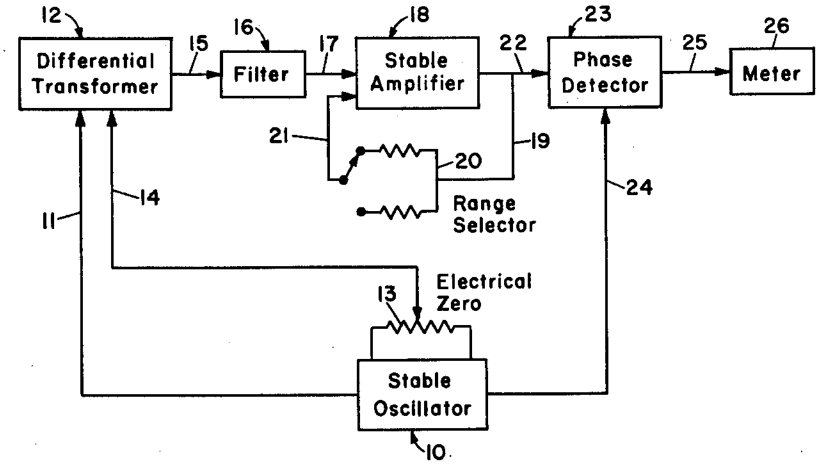

In the drawings:

FIG. 1 is a block diagram of a gaging circuit according to the present invention; and FIG. 2 is a schematic diagram of the gaging circuit of FIG. 1.

Referring to FIG. 1, a stable oscillator 10 provides oscillation of constant amplitude at a frequency of 10 kilocycles which is fed, as is indicated at 11, to a differential transformer 12. A portion of the output of the stable oscillator 10 is fed through an electrical zero adjustment network 13 to another part of the differential transformer 12, as is indicated at 14. The output of the differential transformer 12 is fed, as is indicated at 15, to a series-resonant filter 16. The output of the filter 16 is fed, as is indicated at 17, to a stable amplifier 18. The output of the stable amplifier 18 is fed back, as is indicated at 19, through an inverse-feedback range-selector network 20 to the input of the amplifier, as is indicated at 21. The output of the stable amplifier 18 is connected also, as is indicated at 22, to a phase-detector rectifying circuit 23, which receives also an output signal from the stable oscillator 10, as is indicated at 24. The output of the phase detector 23 is connected, as is indicated at 25, to a meter 26.

FIG. 2 shows a preferred electronic gaging circuit according to the present invention. The stable oscillator 10 is a two-stage resistance-capacitance coupled amplifier employing inductive regenerative feedback from its output circuit to its input circuit to provide oscillation, and having capacitive degenerative feedback from its output to its input including a nonlinear component to maintain the output of the oscillator at a substantially constant amplitude.

Power for the gaging circuit may be furnished by a power supply 30 of any convenient type. The power supply 30 is not required to be a regulated power supply. To minimize costs, it preferably is not a regulated power supply. The negative terminal of the power supply 30 is connected to a conductor 31, which is grounded, as is indicated at 32. The positive terminal of the power supply 30 is connected to a conductor 33, which provides a positive voltage to the plates of the vacuum tubes in the circuit.

A first vacuum tube 34 in the stable oscillator 10 comprises a cathode 35, a grid 36, and a plate 37. The cathode 35 is connected through a cathode-bias resistor 38 to the ground 32. The grid 36 is connected through a grid-bias resistor 39 to the ground 32. The plate 37 is connected through a plate-load resistor 40 to the conductor 33 which is connected to the positive terminal of the power supply 30. A second vacuum tube 41 in the stable oscillator 10 comprises a cathode 42, a grid 43, and a plate 44. The cathode 42 is connected to the conductor 31, which is grounded at 32. The grid 43 is connected through a grid-bias resistor 45 to the ground 32. The plate 44 is connected through a voltage-dropping resistor 46 to one end of a first winding 47 of a powdered-iron-core transformer 48. The other end of the winding 47 is connected to the conductor 33, which is connected to the positive terminal of the power supply 30. A condenser 49 is connected across the winding 47. The values of the inductance of the winding 47 and the capacitance of the condenser 49 are selected to provide parallel resonance at a frequency of approximately 10 kilocycles. The plate 37 of the first vacuum tube 34 is connected to one side of a coupling condenser 50, the other side of which is connected to the grid 43 of the second vacuum tube 41. The plate 44 of the second vacuum tube 41 is connected to one side of a condenser 51, the other side of which is connected to one terminal of a gas discharge tube, such as a neon-glow tube as indicated at 52. The other terminal of the neon-glow tube 52 is connected to the cathode 35 of the first vacuum tube 34. A second winding 53 of the iron-core transformer 48 is inductively coupled to the first winding 47. One end of the winding 53 is connected to the ground 32. The other end of the windnig 53 is connected by a conductor 54 to the grid 36 of the first vacuum tube 34. A third winding 55 and a fourth winding 56 of the iron-core transformer 48 also are inductively coupled to the first winding 47.

The differential transformer 12 comprises a primary winding 57, a secondary winding 58, and an iron slug 59, which is movable longitudinally in both directions. The iron slug 59 of the differential transformer 12 is mechanically connected, as is indicated at 60, to a gage head indicated schematically at 61. One end of the primary winding 57 of the differential transformer 12 is connected by a conductor 62 to the grounded end of the second winding 53 of the oscillator transformer 48. The opposite end of the primary winding 57 of the differential transformer 12 is connected by a conductor 63 to one side of a phase-shift condenser 64 which is connected in parallel with a resistor 65. The opposite side of the condenser 64 is connected to the end of the second winding 53 of the oscillator transformer 48 that is opposite the grounded end.

Connected in series across the third winding 55 of the oscillator transformer 48 are two resistors 66, 67. The connection between the resistors 66 and 67 is grounded, as is indicated at 32. A potentiometer 68 is connected across the winding 55 also. The movable arm 69 of the potentiometer 68 is connected to one side of a phase-shift condenser 70 which is connected in parallel with a resistor 71. The opposite side of the condenser 70 is connected to one end 72 of the secondary winding 58 of the differential transformer 12. A resistor 73 is connected between the end 72 of the winding 58 and a tap 74 on the winding 58. The end 72 of the winding 58 is connected to one end of a resistor 75, the other end of which is grounded, as is indicated at 32. The other end 76 of the secondary winding 58 of the differential transformer 12 is connected to one side of a fixed condenser 77, which is connected in parallel with a variable trimmer condenser 78. The other side of the condenser 77 is connected to a point 79, which is connected to one end of a powdered-iron-core choke 80, the other end of which is connected to one end of a potentiometer 81. The other end of the potentiometer 81 and the movable arm 82 of the potentiometer 81 are grounded, as is indicated at 32. The filter 16, which is tuned by adjustment of the trimmer condenser 78 to series resonance at the frequency of the oscillator 10, comprises the condensers 77, 78, the choke 80, and the potentiometer 81.

The stable amplifier 18 is a two-stage resistance-capacitance coupled amplifier employing negative feedback. The input stage of the stable amplifier 18 includes a vacuum tube 83 having a cathode 84, a grid 85, and a plate 86. The point 79 in the filter 16 is connected to one side of a coupling condenser 87, the other side of which is connected through a grid-bias resistor 88 to the ground 32. The cathode 84 of the vacuum tube 83 is connected through a cathode-bias resistor 89 to the ground 32. The plate 86 is connected to one end of a plate-load resistor 90, the other end of which is connected to a point 91. The point 91 is connected to one end of a voltage-dropping resistor 92, the other end of which is connected to the conductor 33, which is connected to the positive terminal of the power supply 30. The point 91 is connected to one side of an electrolytic bypass condenser 93, the other side of which is connected to the ground 32. The output stage of the stable amplifier 18 includes a vacuum tube 94 comprising a cathode 95, a grid 96, and a plate 97. The plate 86 of the input tube 83 is connected to one side of a coupling condenser 98, the other side of which is connected to the grid 96 of the output tube 94. The grid 96 of the output tube 94 is connected through a grid-bias resistor 99 to the ground 32. The cathode 95 is connected by a conductor 100 to the ground 32. The plate 97 of the output tube 94 is connected to one end 101 of the primary winding 102 of an output transformer 103. The other end 104 of the primary winding 102 is connected to one end of a voltage-dropping resistor 105, the other end of which is connected to the conductor 33, which is connected to the positive terminal of a power supply 30. The end 104 of the primary winding 102 of the output transformer 103 is connected to one side of an electrolytic bypass condenser 106, the other side of which is connected to the ground 32. The plate end 101 of the primary winding 102 is connected to one end of a feedback resistor 107 across which is connected a single-pole-single-throw range-selector switch 108. The other end of the feedback resistor 107 is connected to one end of a feedback resistor 109, the other end of which is connected to one side of a feedback condenser 110. The other side of the feedback condenser 110 is connected to the cathode 84 of the input tube 83.

The secondary winding 111 of the output transformer 103 is connected at one end 112 to one terminal of a rectifier 113. The other end 114 of the winding 111 is connected to one terminal of a rectifier 115. The center tap 116 of the secondary winding 111 of the output transformer 103 is connected to one end 117 of the fourth winding 56 of the oscillator transformer 48. Connected in series between the opposite terminal 118 of the rectifier 113 and the opposite terminal 119 of the rectifier 115 are a resistor 120, a potentiometer 121, and a resistor 122. The movable arm 123 of the potentiometer 121 is connected to the other end 124 of the fourth winding 56 of the oscillator transformer 48. The phase-detector rectifying circuit 23 comprises the output transformer 103, the rectifiers 113, 115, the resistors 120, 122, and the potentiometer 121. The meter 26 is connected across the points 118 and 119, and a filtering condenser 125 is connected in parallel with the meter 26.

The gaging circuit operates as follows:

The power supply 30 provides the power for the operation of the circuit. The stable oscillator 10, which comprises a two-stage resistance-capacitance coupled amplifier, provides oscillation at a frequency of approximately 10 kilocycles in the parallel-resonant circuit comprising the winding 47 of the oscillator transformer 48 and the condenser 49 connected in parallel therewith. The second winding 53 of the oscillator transformer 48 is inductively coupled to the first winding 47 and is connected to the grid 36 of the first vacuum tube 34, thereby providing positive feedback which maintains oscillation. Degenerative feedback is provided from the plate 44 of the second vacuum tube 41 through the capacitor 51 and the neon-glow tube 52 to the cathode 35 of the first vacuum tube 34. The negative feedback provides a sharp cut-off on the amplifier. When the oscillation builds up to an amplitude sufficient to ignite the neon-glow tube 52 in the negative-feedback circuit, the neon-glow tube 52 conducts current and the degenerative feedback reduces the net gain of the amplifier circuit to a value very close to unity, and the amplitude of the oscillation does not increase beyond the sharply-defined limit determined by the ignition characteristic of the neon-glow tube 52. This is not an output-clipping action, but a feedback-control action that opposes the positive feedback from the winding 53 of the transformer 48. The controlled negative feedback limits the net positive feedback to the value required to maintain the amplitude of oscillation at a constant value. The action can be called gated degeneration, or gated-negative feedback.

Output clipping may be likened to swinging a child on a playground swing to a constant height by pushing the swing hard enough each time to cause it to swing beyond the desired height, but limiting the movement of the swing by means of a mechanical stop. The gated-degeneration control employed in the present stable-oscillator circuit may be likened to a more efficient method of swinging a child to a constant height, in which the force with which the swing is pushed is limited to the force necessary to cause the swing to reach the desired height and no higher. At times this force may approach zero. The output-clipping method obviously consumes more energy and distorts the wave form more than does the gated-degeneration method. The distorted wave output of a clipped-amplitude circuit does not provide close regulation of the amplitude of the fundamental component. While the amplitude of the entire wave is limited to a constant value, the fundamental component may vary in amplitude depending upon the original amplitude of the wave that is clipped.

The second winding 53 of the oscillator transformer 48, which is inductively coupled to the first winding 47, feeds a constant-amplitude 10-kilocycle signal to the primary winding 57 of the differential transformer 12 through the resistor 65 and the condenser 64, which are connected in parallel. The resistor 65 and the condenser 64 provide a phase shift of approximately 30 degrees, which is necessary in order to obtain the proper phase relationships in the phase detector 23. The phase shift provided by the resistor 65 and the condenser 64 compensates for the phase shifts encountered in the differential transformer 12 and in the filter 16. The position of the gage head 61, which is mechanically connected, as is indicated at 60, to the slug 59 in the differential transformer 12, determines the position of the slug 59 in the transformer 12. The net-voltage output of the secondary winding 53 of the differential transformer 12 is proportional to the displacement of the slug 59 and of the gage head 61 from a predetermined zero position. When the gage head 61 and the slug 59 are on one side of the zero position, the output of the secondary winding 58 has a predetermined phase, and when the gage head 61 and the slug 59 are on the opposite side of the zero position, the output of the secondary winding 58 has the opposite phase. As the slug 59 moves from one side of the zero position to the other, a phase shift of 180 degrees takes place.

The third winding 55, which is inductively coupled to the first winding 47 of the oscillator 48, provides a 10-kilocycle signal to the secondary winding 58 of the differential transformer 12, the magnitude and phase of which can be controlled to adjust the effective zero position of the slug 59 and of the gage head 61. Since the junction of the resistors 66, 67 is grounded, as is indicated at 32, it is apparent that the potentiometer 68, which is connected across these two resistors, has a corresponding point at ground potential and that the magnitude of the voltage at the movable arm 69 depends upon its distance from this ground-potential point, while the voltage on one side of the ground-potential point is 180 degrees out of phase with the voltage on the opposite side of the ground-potential point. The zero-net-output position for the secondary winding 58 of the differential transformer 12 as a function of the position of the gage head 61 and of the slug 59 can be varied by changing the position of the movable arm 69 of the potentiometer 68. The resistor 71 and the condenser 70 connected in parallel therewith provide a phase shift of approximately 60 degrees to compensate for the phase shift in the resistor 65 and the condenser 64 in parallel therewith and in the differential transformer 12. The electrical zero adjusting voltage from the third winding 55 of the oscillator transformer 48 and the components connected thereto provides a voltage across the resistance 75 between the ground 32 and end 72 of the second winding 58 of the differential transformer 12. The voltage between the ground 32 and the end 76 of the winding 58 is the algebraic sum of the electrical zero adjusting voltage and the voltage across the second winding 58 of the differential transformer 12. The resistor 73 connected between the end 72 and the tap 74 of the secondary winding 78 serves as a convenient means for balancing out any inequality in the phases of the voltages in the two halves of the winding 58. The resistor 73 is not essential, however, and can be omitted if desired.

The condensers 77, 78, the powdered-iron-core choke 80, and the potentiometer 81 comprise the filter 16, which is tuned to series resonance at the frequency of the oscillator, approximately 10 kilocycles. The position of the movable arm 82 of the potentiometer 81 controls the Q of the circuit and thereby controls the gain in the filter 16. The filter 16 serves not only to filter out any harmonics present in the signal from the differential transformer 12, but also to provide a good impedance match between the differential transformer 12 and the stable amplifier 18, and to provide a voltage gain of approximately 40. The series-resonant circuit comprising the filter 16 has a very low net impedance between the ground 32 and the end 76 of the secondary winding 58 of the differential transformer 12, and when a voltage at the operating frequency is present across these points, the current through the series-resonant circuit is large. The large current provides a high voltage between the ground 32 and the point 79, since the impedance of the choke 80 in series with the potentiometer 81 is much higher than the net impedance of the complete series-resonant circuit.

The voltage at the point 79 in the filter 16 is connected through the coupling condenser 87 to the grid 85 of the input tube 83 of the stable amplifier 18. The amplifier 18 is a conventional two-stage resistance-capacitance coupled amplifier having transformer output. Over-all negative feedback is provided from the plate 97 to the output tube 94 through the resistors 107, 109, and the condenser 110 to the cathode 84 of the input tube 83 to stabilize the gain of the amplifier 18. The sensitivity of the gage can be changed by means of the range-selector switch 108. When the switch 108 is open, the resistor 107 is in series with the resistor 109 in the feedback circuit, and the net gain of the amplifier 18 is greater than it is when the range-selector switch 108 is closed, shorting out the resistor 107 and thereby providing a larger negative feedback in the circuit.

The phase detector 23 is a bridge-rectifier circuit in which a reference voltage is inductively coupled from the fourth winding 56 of the transformer 48 of the stable oscillator 10 to the points 116 and 123 in the phase detector 23. The point 116 is the center tap of the output winding 111 of the amplifier-output transformer 103. The point 123 is the movable arm of the potentiometer 121, the position of which is adjusted to balance the bridge circuit so that when the output of the amplifier 18 is zero, the current between the points 123 and 116 through the path 123, 118, 113, 116 is equal to the current between the same two points through the path 123, 119, 114, 116. The movable arm 123 of the potentiometer 121 serves as a zero centering adjustment to compensate for any slight variations in the rectifiers 113, 115 on each side of the bridge by adjusting for zero reading of the meter 26 when the output from the stable amplifier 18 is zero. The voltage drop from the point 123 to the point 118 is equal to the voltage drop between the point 123 and the point 119, and the point 118 has the same potential as the point 119, so the voltage across the meter 26 is zero.

Because of the phase compensation provided in the circuits connected to the differential transformer 12, any output of the stable amplifier 18 is always either in phase with or 180 degrees out of phase with the reference voltage connected from the forth winding 56 of the oscillator transformer 48 to the points 116, 123, depending upon whether the gage head 61 and the movable slug 59 of the differential transformer 12 are above or below the electrical zero position. If the output of the amplifier 18 is in phase with the reference voltage from the oscillator 10, the component of the current resulting from the output of the amplifier 18 is in phase with the component of the current resulting from the reference voltage from the oscillator 10 along the path 123, 118, 112, 116 and is 180 degrees out of phase with the component of the current resulting from the reference voltage along the path 123, 119, 114, 116. The total current along the path 123, 118, 112, 116 is larger, therefore, than the net current through the path 123, 119, 114, 116, and the potential at the point 118 is higher than the potential at the point 119. This difference in potential is a linear function of the position of the gage head 61 and the movable slug 59 of the differential transformer 12 and provides a deflection in the meter 26 proportional to the distance of the gage head 61 and the movable slug 59 from the zero position.

When the gage head 61 and the movable slug 59 of the differential transformer 12 are on the opposite side of the zero position, the current through the path 123, 119, 114, 116 is greater than the current through the path 123, 118, 112, 116, so the potential at the point 119 is higher than the potential at the point 118, and the meter 26 deflects in the opposite direction by an amount proportional to the distance of the gage head 61 and the movable slug 59 from the zero position. Because of the presence of the rectifiers 113, 115 and in the bridge circuit, the currents referred to are all half-cycle currents, the point 118 always has a positive potential with respect to the point 123, and the point 119 always has a positive potential with respect to the point 123. It is the difference between the potential at the point 118 and the potential at the point 119 that is measured by the meter 26.

The electronic gaging circuit thus provides an indication of the direction and the amount that any dimension determined by the position of the gage head 61 deviates from a desired value of the dimension corresponding to the zero position of the gage head 61 and the movable slug 59 of the differential transformer 12. The gage may also be calibrated in any other desired manner. The voltage between the points 118 and 119 connected to the meter 26 can be connected also to automatic classifying equipment, recording equipment, and control equipment, if desired.

From the foregoing disclosure, it is apparent that an improved electronic gaging circuit has been provided, including a novel stable oscillator for providing an output of constant amplitude, wherein accurate and reliable high-speed gaging can be provided for use with electronic classifying and recording means in a fully automatic gaging system, without requiring the use of a regulated power supply. The electronic gaging circuit of the present invention provides greater accuracy than prior devices, and is less expensive to manufacture.

An embodiment of the present invention has been made and tested, with satisfactory results, for linearity, reproducibility, electrical zero control, independence of line-voltage variation, and effects of electromagnetic disturbance and mechanical shock. The stable oscillator maintained an output voltage constant to within less than one percent with the line voltage varied between the limits of 100 volts and 130 volts.

The gaging circuit can be varied in many obvious ways. Other equivalent circuits and components can be used in various parts of the circuit. Additional ranges can be obtained by providing additional switching means in the feedback circuit of the stable amplifier 18. The stable oscillator circuit 10 can be varied by using other oscillator circuits and adding the gated-degeneration means according to the present invention. While the form of the invention herein disclosed constitutes a preferred embodiment, it is not intended herein to describe all of the possible equivalent forms or ramifications of the invention. It will be understood that the words used are words of description rather than of limitation and that various changes may be made without departing from the spirit or scope of the invention herein disclosed.

What is claimed is:

1. An amplitude-stabilized oscillator comprising: amplifier means providing oscillation in a parallel-resonant circuit comprising a first inductance and a capacitance connected in parallel at the output end of said amplifier means; a second inductance inductively coupled to said first inductance and connected to the input end of said amplifier means in such manner as to provide positive feedback thereto for maintaining oscillation; a capacitance and a gas discharge tube connected in series between said output end of said amplifier means and said input end of said amplifier means in such manner as to provide negative feedback to said input end and to maintain the amplitude of oscillation at a substantially constant value.

2. In an amplitude-stabilized oscillator: amplifier means; resonant means; and a capacitance and a gas discharge tube in a circuit independent of said resonant circuits connected in series between the output end of said amplifier means and the input end of said amplifier means in such manner as to provide negative feedback to said input end and to maintain the amplitude of oscillation at a substantially constant value.

References Cited in the file of this patent

UNITED STATES PATENTS

| | | |
|---|---|---|
| 2,175,694 | Jones | Oct. 10, 1939 |
| 2,231,558 | Bollman | Feb. 11, 1941 |
| 2,352,219 | Olesen | June 27, 1944 |
| 2,427,491 | Blumlein | Sept. 16, 1947 |
| 2,444,349 | Harrison | June 29, 1948 |
| 2,599,945 | Schmitt | June 10, 1952 |

FOREIGN PATENTS

| | | |
|---|---|---|
| 425,308 | Great Britain | Mar. 7, 1935 |